Sept. 22, 1970   P. JOBMANN   3,529,318
SKINNING OF FISH FILLETS
Filed Dec. 23, 1968

INVENTOR
P. Jobmann
BY Richards & Geier
ATTORNEYS

United States Patent Office 3,529,318
Patented Sept. 22, 1970

3,529,318
SKINNING OF FISH FILLETS
Paul Jobmann, Lubeck, Germany, assignor to Nordischer Maschinenbau Rud. Baader, Lubeck, Germany, a corporation of Germany
Filed Dec. 23, 1968, Ser. No. 785,963
Int. Cl. A22c 25/00
U.S. Cl. 17—62                                   9 Claims

ABSTRACT OF THE DISCLOSURE

A skinning machine for fish fillets is disclosed which has a pair of cooperating counter-rotating rollers forming a fillet feeding gap. Fillets of fish are supplied to the gap and the leading end of the fillet is met by the cutting edge of an oscillating skinning knife disposed on the outlet side of the gap with the cutting edge at or near the narrowest point of said gap. The cutting edge is fixed very close to (e.g. 0.4 mm. from) the circumference of the skinning roller.

Figure 1:
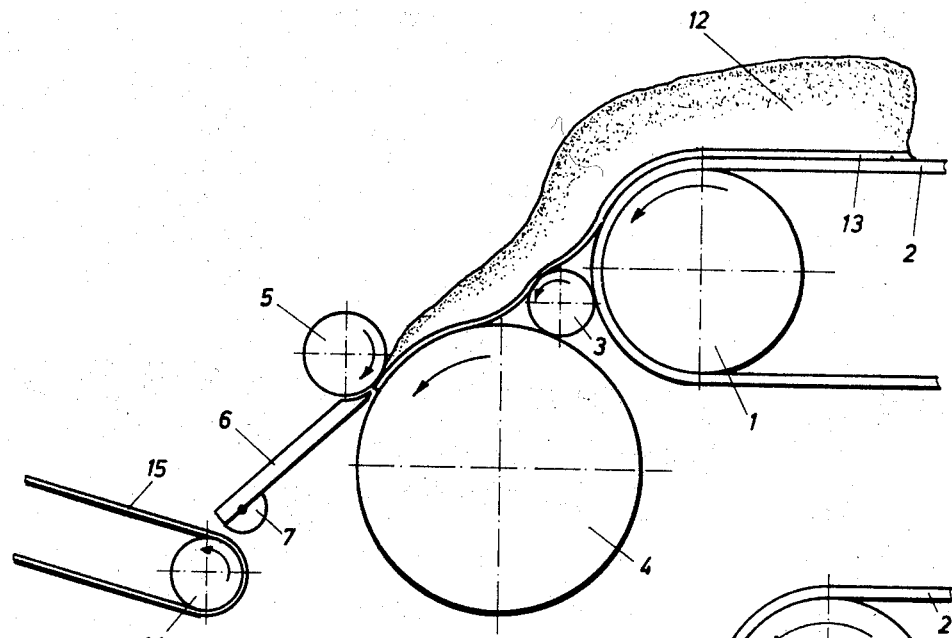

This invention relates to the skinning of fish or fillets of fish in a manner which avoids wastage of good edible flesh to a greater extent than heretofore.

In the skinning of fish fillets it is desirable to remove the outer skin layer from the flesh or muscular tissue of the fillet while leaving the silvery subcutaneous tissue on the fillet. It is known for example from German patent specification No. 680,720, to employ apparatus wherein deboned fish fillets are drawn past a stationary knife by means of a pair of rollers which may have roughened surfaces, the knife acting between the fish flesh and the skin. In this case the skinning knife is connected, through a transmission, to a control member which is displaced by the leading end of the fish fillet and is adapted to move the skinning knife from a forward, inoperative position into a cutting position. While this provides a well skinned fish fillet it has the disadvantage that the piece of fish flesh which has traversed under the cutting edge of the skinning knife in its inoperative position, on the feed-in side of the pair of rollers, is cut off when the skinning knife moves into a cutting position. The cause of this initial cutting loss is the location of the knife edge on the feed-in side of the gap between the rollers and the amount of loss depends on the distance of the knife edge from the gripping position of the pair of rollers.

Accordingly it is a principal object of the present invention to provide apparatus which will skin fish fillets without an initial cutting loss. A further object of the invention is to improve the fish meat yield, which would otherwise be obtained, by a few percent. Yet another object is to make possible the mechanised skinning of small fish fillets which was not previously possible for economic reasons.

Yet a further object of the present invention is to provide apparatus capable of skinning small plaice without the loss of fish flesh which has previously made them of such a shape that they tend to be rejected by customers.

According to the present invention apparatus for the skinning of fish or fish fillets (hereafter referred to as fish fillets) includes a pair of cooperating counter-rotating rollers, namely a skinning roller and a pressure roller, the rollers forming between them a fillet feeding gap, an oscillating skinning knife being disposed on the outlet side of said gap with its cutting edge at or near the narrowest point of the gap and at a fixed distance from the circumference of the skinning roller. Preferably the pressure roller is mounted for movement towards and away from the skinning roller and is spring biased towards the skinning roller. It is generally desirable that the pressure roller should be arranged to rotate at the same or a higher speed than the skinning roller.

The edge of the skinning knife may be provided with a chamfer on its side facing the skinning roller which chamfer extends approximately tangentially to the circumference of the skinning roller.

It is preferable to incorporate a pressure pad disposed between the skinning knife and the skinning roller and fixed in relation to the skinning roller and forming with the circumference thereof a narrow gap for admitting the skin.

Figure 2:
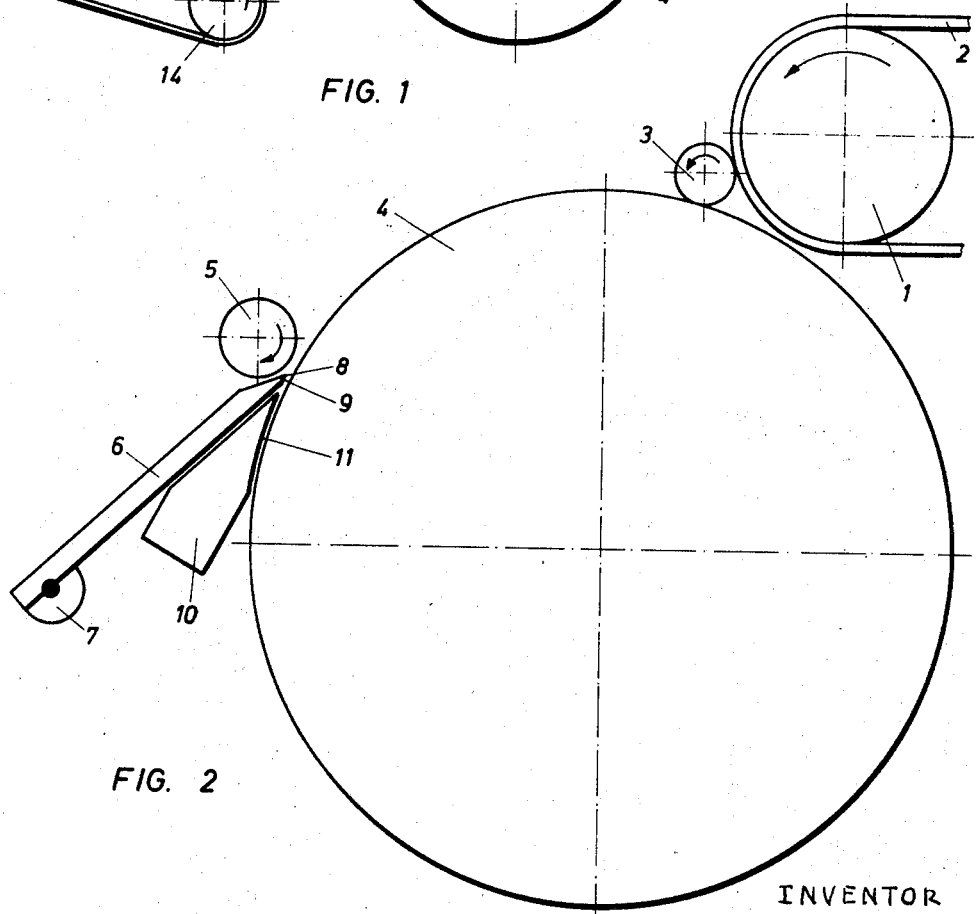

The invention may be carried into practice in a number of ways but certain specific embodiments will now be described by way of example with reference to the accompanying drawings in which FIG. 1 diagrammatically illustrates in longitudinal cross-section, a machine for the skinning of fish fillets and FIG. 2 shows a similar diagrammatic cross-section of a machine for skinning small fish fillets such as fillets of plaice.

In a machine frame which is not shown, or disposed between two housings, is a belt cylinder 1 of a feeder belt 2. A skinning roller 4 is disposed below and to one side of the feeder belt and between said skinning roller and the belt cylinder is a transfer roller 3, while a belt cylinder 14, supporting a delivery belt 15, is unslidably and rotatably journalled at a distance from the skinning roller 4. The aforementioned cylinders and rollers are driven anticlockwise in suitable manner so that the transfer cylinder 3 rotates at a greater circumferential speed than the belt cylinder 1, the skinning roller 4 rotates at a greater circumferential speed than the transfer cylinder 3 and the belt cylinder 14 rotates at a higher speed than the skinning cylinder 4.

A pressure roller 5, adapted to rotate clockwise, is disposed above the skinning roller 4 so as to be deflectable—for example by means of a pair of interconnected radial rods which are not shown—and is spring-biased towards the skinning roller 4. The pressure roller 5 is also driven in a suitable manner so that its circumferential speed is equal to or higher than that of the skinning roller 4. A knife support 7 is journalled above the belt cylinder 14 in the frame or housing. The knife support is rotatable about its axis i.e. towards and away from the skinning roller 4 and has an oscillating motion imparted to it in the direction of its longitudinal axis, said oscillation permitting the knife support to execute deflections of at least ±5 mm. at a freqeuncy of at least 800 oscillations per minute. The knife support, flattened over part of its length, supports a skinning knife 6 which is flattened on its top and is provided with a chamfer 9 (see FIG. 2) below its cutting edge 8, said chamfer being disposed tangentially to the circumferential part of the skinning roller 4 disposed therebelow. The knife 6 is located in the fillet and dermis outlet or discharge gap between the rollers 4 and 5 at or near the closest point of their surfaces as seen in FIGS. 1 and 2. The pivoting range of the skinning knife 6 is adjustable by a pair of suitable stops which are not shown and said pivoting range is so limited that the skinning knife 6 remains at a fixedly set distance relative to the circumference of the skinning roller 4.

In the embodiment of the apparatus according to FIG. 2, a pressure pad 10 is disposed below the skinning knife 6 at a fixed distance (e.g. 0.4 mm.) from the circumference of the skinning roller 4, the pressure surface 11 of said pressure pad being curved so as to extend parallel to the circumference of the skinning roller 4 and for example at approximately 0.2 mm. therefrom. The skinning roller 4 and the pressure roller 5 are provided in known manner with knurling or cross-knurling. The pressure roller 5 is advantageously provided with longitudinal flutes which are uniformly distributed on its circumference to enable the end of the incoming fillet to be pressed downwardly upon the skinning roller 4.

The pressure pad 10 is advantageously employed if the skinning roller 4 is provided with longitudinal flutes of small depth in order to ensure reliable conveyance of the skin of the fish fillet.

The method of operation of the apparatus according to the invention is as follows:

A fish fillet 12, whose skin 13 is placed upon the feeder belt 2, runs with its leading end over the transfer cylinder 3 on to the circumference of the skinning roller 4 while being stretched owing to the pull applied by the slightly higher circumferential speed of the skinning roller 4 relative to the transfer cylinder 3. The fillet end, bearing upon the skinning roller 4, reaches the pull-in wedge in the feeding or receiving gap formed by the skinning roller 4 and the pressure roller 5, said end bearing flush on the circumference of the skinning roller 4 in said pull-in wedge. The leading end of the fillet is guided against the cutting edge 8 of the skinning knife 6, which, under the action of its oscillating motion (e.g. with a stroke of ±5 mm. and a frequency of at least 800 strokes per min.), penetrates into the fatty layer and separates the dermis from the muscular substance of the fish fillet while leaving the silvery subcutaneous tissue thereon. While the dermis is entrained by clamping between the skinning roller 4 and the chamfer 9 of the skinning knife 6 the fish fillet passing between the skinning roller 4 and the pressure roller 5 is pushed over and slides along the top of the skinning knife 6 with the aid of the pressure roller 5 until said fillet is contacted by the delivery belt 15 and is conveyed.

To skin fish fillets having a very thin or smooth skin, it is advisable to employ a skinning cylinder 4 having longitudinal flutes of shallow depth and being associated with a pressure pad 10 adapted to ensure the reliable feed of skins such as those described hereinabove.

To permit adaptation of the apparatus to fillets to different kinds of fish, fish sizes and fish quality, it may be necessary to adjust the knife chamfer to a distance other than 0.4 mm. or for the distance of the pressure pad to be set to a value other than 0.2 mm. The machine according to the invention has been found to be of particularly universal utility for the skinning of fish fillets when the skinning roller has a diameter of more than 120 mm. and rotates at a circumferential speed of 40 to 60 m./min. while a diameter of less than 15 mm. has been found advantageous for the pressure roller.

What I claim as my invention and desire to secure by Letters Patent is:

1. Apparatus for the skinning of fish fillets including a pair of adjacent co-operating counter-rotating rollers, namely a skinning roller and a pressure roller, the rollers forming between them a fillet feeding gap, and defining a pair of moving pull-in means, a longitudinally occillating skinning knife disposed on the outlet side of the said gap with its cutting edge at least near the narrowest point of the said gap and at a fixed distance from the circumference of the skinning roller.

2. Apparatus as claimed in claim 1 in which the pressure roller is mounted for movement towards and away from the skinning roller and is spring biased towards the skinning roller.

3. Apparatus as claimed in claim 1 wherein the pressure roller is arranged to rotate at least at the same speed as the skinning roller.

4. Apparatus as claimed in claim 1 wherein the edge of the skinning knife is provided with a chamfer on its side facing the skinning roller which chamfer extends approximately tangentially to the circumference of the skinning rollers.

5. Apparatus as claimed in claim 1 including a pressure pad disposed between the skinning knife and the skinning roller and fixed in relation to the skinning roller and forming with the circumference thereof a narrow gap for admitting the skin.

6. Apparatus as claimed in claim 5 wherein the pressure pad has a forward edge disposed beyond the chamfer of the skinning knife, as viewed in the direction of movement of the fillet.

7. Apparatus as claimed in claim 5 wherein the pressure pad is provided with a surface facing the skinning roller and extending substantially parallel thereto.

8. Apparatus as claimed in claim 1 wherein the cutting edge of the skinning knife is disposed approximately on the line connecting the axes of the skinning and pressure rollers, the skinning roller having a diameter of at least 120 mm., and the pressure roller having a diameter of less than 15 mm., the skinning knife being adapted to oscillate with a stroke of at least plus or minus 5 mm., and at a freqeuncy of not less than 800 strokes per minute, and this cutting edge being positioned at a distance of approximately 0.4 mm. from the circumference of the skinning roller.

9. Apparatus as claimed in claim 1 in which the cutting edge of the skinning knife is disposed approximately on the line connecting the axes of the skinning and pressure rollers, the skinning roller having a diameter of at least 120 mm., and the pressure roller having a diameter of less than 15 mm., the skinning knife being adapted to oscillate with a stroke of at least plus or minus 5 mm., and at a frequency of not less than 800 strokes per minute, and this cutting edge being positioned at a distance of approximately 0.4 mm. from the circumference of the skinning roller, the surafce of the pressure pad facing the skinning roller being positioned at a distance of approximately 0.2 mm. from the circumference of the skinning roller and the front edge of the pressure pad being disposed approximately 2 mm. behind the front edge of the skinning knife.

References Cited

UNITED STATES PATENTS

| 1,596,649 | 8/1926 | Barry | 17—62 |
| 2,215,114 | 9/1940 | Baader et al | 17—62 |
| 2,601,292 | 6/1952 | Hube | 17—62 |
| 2,806,245 | 9/1957 | Bartels | 17—62 |
| 3,164,858 | 1/1965 | De Moss | 17—62 |

FOREIGN PATENTS

| 225,935 | 4/1969 | Sweden. |

ALDRICH F. MEDBERY, Primary Examiner